US009472160B2

(12) United States Patent
Choi

(10) Patent No.: US 9,472,160 B2
(45) Date of Patent: Oct. 18, 2016

(54) DISPLAY APPARATUS, MULTI DISPLAY SYSTEM, AND CONTROL METHOD THEREOF

(71) Applicant: SAMSUNG ELECTRONICS CO., LTD., Suwon-si (KR)

(72) Inventor: Kyoung-oh Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/835,071

(22) Filed: Aug. 25, 2015

(65) Prior Publication Data

US 2015/0364108 A1    Dec. 17, 2015

Related U.S. Application Data

(63) Continuation of application No. 14/305,334, filed on Jun. 16, 2014, now Pat. No. 9,147,233, which is a continuation of application No. 12/534,440, filed on Aug. 3, 2009, now Pat. No. 8,791,876.

(30) Foreign Application Priority Data

Oct. 21, 2008    (KR) ..................... 10-2008-0103207

(51) Int. Cl.
*G09G 5/00* (2006.01)
*G09G 5/36* (2006.01)
(Continued)

(52) U.S. Cl.
CPC ............. *G09G 5/005* (2013.01); *G06F 3/1446* (2013.01); *G06T 5/003* (2013.01); *G09G 5/363* (2013.01); *G09G 5/38* (2013.01); *G09G 2340/0407* (2013.01); *G09G 2340/0428* (2013.01)

(58) Field of Classification Search
CPC .......... G09G 5/00; G09G 3/36; G06T 17/00; G06T 1/20; G06F 3/048
See application file for complete search history.

(56) References Cited

U.S. PATENT DOCUMENTS 5,923,307 A * 7/1999 Hogle, IV ........... G06F 3/04897
345/1.3
6,295,048 B1   9/2001 Ward et al.
(Continued)

FOREIGN PATENT DOCUMENTS

JP       2006-115001 A    4/2006
KR   10-2004-0043418 A    5/2004
(Continued)

OTHER PUBLICATIONS

Office Action dated Aug. 28, 2014 issued by Korean Intellectual Property Office in counterpart Korean Application No. 10-2008-0103207.
(Continued)

*Primary Examiner* — Pegeman Karimi
(74) *Attorney, Agent, or Firm* — Sughrue Mion, PLLC

(57) ABSTRACT

Display apparatus, multi display system, and control method are provided. The display apparatus which comprises a display unit displaying an image, the display apparatus include: a storing unit in which information about a maximum resolution of the display unit is stored; a signal processing unit which captures an area of an input image signal of a high resolution, and processes the captured image signal to enable the display unit to display the input image signal if the input image signal has a resolution higher than the maximum resolution of the display unit stored in the storing unit; and an output unit which outputs the image signal input to the signal processing unit to an outside. With this, display apparatus, a multi media system and a control method thereof are capable of displaying an input image signal having resolution higher than a maximum resolution of a display unit.

19 Claims, 10 Drawing Sheets

(51) Int. Cl.
*G06T 5/00* (2006.01)
*G06F 3/14* (2006.01)
*G09G 5/38* (2006.01)

(56) References Cited

U.S. PATENT DOCUMENTS

| | | | |
|---|---|---|---|
| 6,411,302 B1 | 6/2002 | Chiraz | |
| 6,885,410 B2 | 4/2005 | Chung et al. | |
| 7,092,247 B2 * | 8/2006 | Kim | G06F 1/1641 361/679.04 |
| 7,450,176 B2 | 11/2008 | Koh | |
| 2004/0027482 A1 | 2/2004 | Lee et al. | |
| 2004/0046707 A1 * | 3/2004 | Mori | G06F 3/1431 345/1.1 |
| 2004/0109084 A1 * | 6/2004 | Koh | H04N 9/12 348/383 |
| 2006/0161948 A1 * | 7/2006 | Hwa | G06F 3/1446 725/37 |
| 2006/0168532 A1 | 7/2006 | Stevens et al. | |
| 2007/0024645 A1 * | 2/2007 | Purcell | G06F 3/1431 345/634 |
| 2009/0094658 A1 * | 4/2009 | Kobayashi | H04N 5/775 725/118 |
| 2009/0147130 A1 * | 6/2009 | Kim | G09G 5/003 348/383 |
| 2009/0300541 A1 | 12/2009 | Nelson | |

FOREIGN PATENT DOCUMENTS

| | | |
|---|---|---|
| KR | 10-2006-0023832 A | 3/2006 |
| KR | 10-2007-0092857 A | 9/2007 |

OTHER PUBLICATIONS

Notice of Allowance dated Nov. 14, 2014 issued by Korean Intellectual Property Office in counterpart Korean Application No. 10-2008-0103207.

* cited by examiner

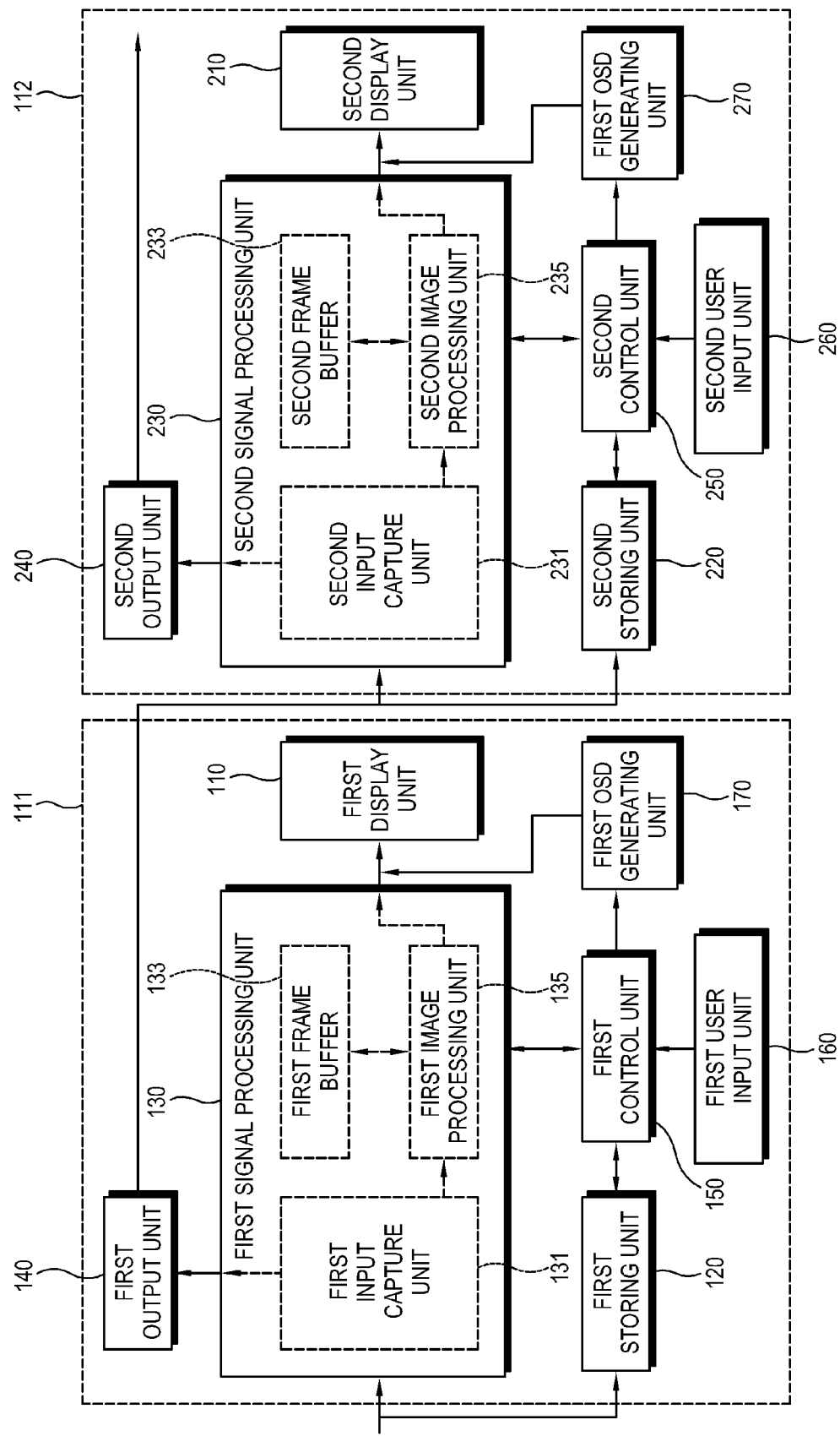

DISPLAY APPARATUS, MULTI DISPLAY SYSTEM, AND CONTROL METHOD THEREOF

CROSS-REFERENCE TO RELATED APPLICATION

This is a continuation application of U.S. patent application Ser. No. 14/305,334 filed Jun. 16, 2014, which is a continuation of U.S. patent application Ser. No. 12/534,440 filed Aug. 3, 2009 and issued as U.S. Pat. No. 8,791,876 on Jul. 29, 2014, which claims priority from Korean Patent Application No. 10-2008-0103207, filed on Oct. 21, 2008 in the Korean Intellectual Property Office, the entire disclosures of the prior applications are considered part of the disclosure of the accompanying application, and are incorporated herein by reference.

BACKGROUND OF THE INVENTION

1. Field of the Invention

Apparatuses and methods consistent with the present invention relate to a display apparatus, a multi display system and a control method thereof, and more particularly, to a display apparatus, a multi display system and a control method thereof receiving an image signal having resolution higher than a maximum resolution of a display unit to be displayed by the display unit.

2. Description of the Related Art

A display apparatus is an apparatus processing an image signal supplied from an image signal supplying source, and displaying in a display unit.

Here, the image signal supplying source is connected with the display apparatus, and supplies an image signal having a resolution which a display unit of the display apparatus is capable of displaying to the display apparatus. In general, the image signal supplying source supplies an image signal having a maximum resolution of the display unit to the display apparatus. This image signal supplying source includes various devices capable of supplying an image signal such as a computer main body, a digital versatile disk (DVD) player, a video tape recorder (VTR), etc.

However, a conventional display apparatus is capable of displaying an image signal having resolution equal to or less than a maximum resolution which is the maximum resolution which a display unit is capable of displaying, but is incapable of displaying an image signal having resolution that is higher than the maximum resolution. Accordingly, if an image signal of a resolution that is higher than the maximum resolution of the display unit is received, the conventional display apparatus lowers the resolution to be appropriate to the maximum resolution of the display unit, and displays in the display unit, thereby failing to display the image at the input high resolution.

SUMMARY OF THE INVENTION

Accordingly, it is an aspect of the present invention to provide a display apparatus, a multi media system and a control method thereof capable of displaying an input image signal having resolution higher than a maximum resolution of a display unit.

The foregoing and/or other aspects of the present invention can be achieved by providing a display apparatus which comprises a display unit displaying an image, the display apparatus including: a storing unit in which information about a maximum resolution of the display unit is stored; a signal processing unit which captures an area of an input image signal of a high resolution, and processes the captured image signal to enable the display unit to display the input image signal if the input image signal has a resolution higher than the maximum resolution of the display unit stored in the storing unit; and an output unit which outputs the image signal input to the signal processing unit to an outside.

The display apparatus may further include: a user input unit which selects an area of an image signal of a high resolution input to the signal processing unit, and a control unit which controls the signal processing unit to display the area selected by the user input unit.

The display apparatus may further include an on screen display (OSD) generating unit which generates a display area setting menu to select an area of the image signal of the high resolution input to the signal processing unit.

The OSD generating unit may further generate a number setting menu to select the number of partition areas to partition the image signal of the high resolution input to the signal processing unit.

The storing unit may further store information about resolutions higher than the maximum resolution of the display unit, and the image signal of the high resolution input to the signal processing unit may be based on information about one of the high resolutions stored in the storing unit.

The information stored in the storing unit may include horizontal and vertical resolutions and a frame frequency, and the frame frequency of the information about the high resolutions stored in the storing unit may be smaller than a frame frequency of the display unit stored in the storing unit.

The display apparatus may further include an OSD generating unit which generates an optimal resolution setting menu to set one of the information about the resolutions stored in the storing unit as an optimal resolution, wherein the control unit may control the OSD generating unit to display the optimal resolution setting menu in the display unit by the user input unit, and control the storing unit to set a resolution set in the optimal resolution setting menu as the optimal resolution, and the image signal input to the signal processing unit may have the resolution set in the optimal resolution setting menu.

Another aspect of the present invention may be achieved by providing a multi display system, including: a first display apparatus; and a second display apparatus which is connected with the first display apparatus in series, the first display apparatus including: a first display unit displaying an image; a first storing unit in which a maximum resolution of the first display unit is stored; a first signal processing unit capturing an area of an input image signal of a high resolution, and processing the captured image signal to enable the first display unit to display the input image signal if the input image signal has a resolution higher than the maximum resolution stored in the first storing unit; and a first output unit outputting the image signal of the high resolution input to the first signal processing unit to an outside, and the second display apparatus include: a second display unit displaying an image; a second storing unit in which a maximum resolution of the second display unit is stored; and a second signal processing unit capturing an area of the input image signal of a high resolution, and processing the captured image signal to enable the second display unit to display the input image signal if the input image signal input from the first output unit has a resolution higher than the maximum resolution stored in the second storing unit.

The second display apparatus may further include a second output unit which outputs the image signal of the high resolution input to the second signal processing unit to an outside.

Another aspect of the present invention may be achieved by providing a control method of a display apparatus which comprises a display unit displaying an image, wherein the control method of the display apparatus includes: capturing an area of an input image signal of a high resolution if the input image signal has a resolution higher than a maximum resolution of the display unit; processing the image signal so that the display unit can display the captured image signal; and outputting the input image signal of the high resolution to an outside.

The control method of the display apparatus may further include a user input operation for selecting an area of the input image signal of the high resolution if the input image signal has a resolution higher than the maximum resolution of the display unit.

The user input operation may further include displaying a display area setting menu in the display unit to select an area of the input image signal of the high resolution depending on an input of a user, and the capturing the area may include capturing an area set in the display area setting menu.

The user input operation may include displaying in the display unit, a mode menu for selecting one of a single display mode and a multi display mode depending on an input of a user, displaying in the display unit a number setting menu to select the number of a partition area for partitioning the input image signal of the high resolution if the multi display mode is selected in the mode menu, and displaying in the display unit the display area setting menu to correspond to a set number of the partition area if the number of the partition area is set in the number setting menu.

The display apparatus may further include a storing unit storing information about the maximum resolution of the display unit and the resolution higher than the maximum resolution, the control method of the display apparatus may further include generating an optimal resolution setting menu to set one of the resolution information stored in the storing unit as an optimal resolution, and controlling the storing unit to set the resolution set in the optimal resolution setting menu as the optimal resolution, and the input image signal may have the resolution set in the optimal resolution setting menu.

BRIEF DESCRIPTION OF THE DRAWINGS

The present invention will become apparent and more readily appreciated from the following description of the exemplary embodiments, taken in conjunction with the accompanying drawings, in which:

FIG. 10 is a control block diagram of the multi display system according to the exemplary embodiment of the present invention.

DETAILED DESCRIPTION OF EXEMPLARY EMBODIMENTS

Figure 1:
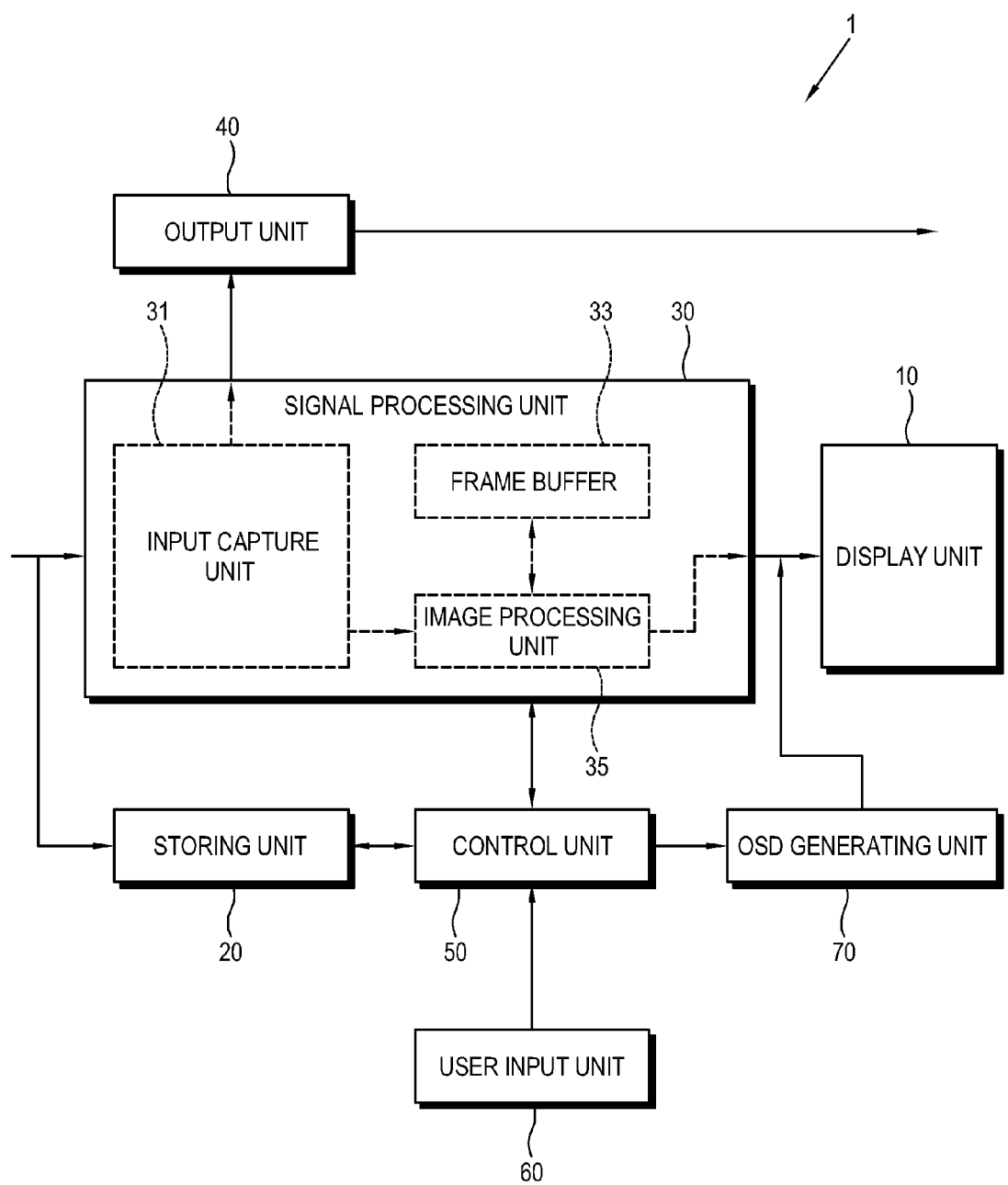
FIG. 1 is a control block diagram of a display apparatus according to an exemplary embodiment of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Repetitive description with respect to like elements of different embodiments may be omitted for the convenience of clarity.

FIG. 1 is a control block diagram of a display apparatus according to an exemplary embodiment of the present invention.

As shown in FIG. 1, a display apparatus 1 according to an exemplary embodiment of the present invention includes a display unit 10 displaying an image, a storing unit 20 in which a maximum resolution information of the display unit 10 is stored, a signal processing unit 30 capturing an area of an input image signal of a high resolution, and processing the captured image signal to enable the display unit 10 to the input image signal display if the input image signal has a resolution higher than the maximum resolution of the display unit 10 stored in the storing unit 20, and an output unit 40 outputting the image signal of the high resolution input the signal processing unit 30 to an outside. The display apparatus 1 according to the present exemplary embodiment may further include a user input unit 60 for selecting an area of the image signal of the high resolution input to the signal processing unit 30, and a control unit 50 controlling the signal processing unit 30 to display the area selected by the user input unit 60.

The display unit 10 includes a flat display panel such as a liquid crystal display (LCD) panel to display an image signal output from the signal processing unit 30, and has a maximum resolution which is a displayable horizontal and vertical maximum resolution, and a frame frequency which is a vertical refresh rate. For example, the display unit 10 may have the maximum resolution of 1280 horizontal×1024 vertical, and the frame frequency of 60 Hz. However, the display unit 10 of the present invention is not limited thereto, and may have various resolutions and frame frequencies such as resolution of 2560 horizontal×2048 vertical and a frame frequency of 70 Hz, etc. Also, the display unit 10 according to the present exemplary embodiment is not limited to the LCD panel, and may include various types of display devices such as a cathode ray tube (CRT), a plasma display panel (PDP), an organic light emitting diode (OLED), etc.

The storing unit 20 according to the present exemplary embodiment is a non volatile memory storing information about the resolution and the frame frequency of the display unit 10. The storing unit 20 may store information about resolutions higher than the maximum resolution of the display unit 10. Also, an image signal having a high resolution input to the signal processing unit 30 may be based on information about a high resolution stored in the storing unit 20. That is, the storing unit 20 stores various extended display identification data (EDID) informations such as information about resolution higher or lower than the maximum resolution of the display unit 10 in addition to the information about the maximum resolution and the frame frequency of the display unit 10. Also, the storing unit 20 sets a resolution and a frame frequency most appropriate to the display unit 10 as optimal resolution and frame frequency. Accordingly, if the display apparatus 1 is connected an image signal supplying source supplying an image signal through a cable, the image signal supplying source outputs an image signal to the display apparatus 1 based on the EDID informations stored in the storing unit 20. That is, the image signal supplying source outputs to the display apparatus 1, the image signal having the optimal resolution and frame frequency among the EDID informations stored in the storing unit 20.

For example, the storing unit 20 stores the EDID informations in a generating operation. However, the storing unit 20 is not limited thereto. The EDID informations may be input by a user, etc., after the generation is completed. That is, a user may delete, add and change the EDID informations stored in the storing unit 20 through the user input unit 60, the control unit 50, etc.

For example, information about resolutions higher than the maximum resolution of the display unit 10 stored in the storing unit 20 may have a frame frequency smaller than the display unit 10. That is, for example, if the display unit 10 has the maximum resolution of 1280×1024 and the frame frequency of 60 Hz, the frame frequency of resolution 2560×1024 which is horizontally twice as high as the maximum resolution of the display unit 10 stored in the storing unit 20 may be 30 Hz which is a half of 60 Hz. Like this, if resolution of an image signal is increased to be twice, and a frame frequency is reduced to be half, the amounts of transmitted data are the same, thereby efficiently using the maximum bandwidth which the cable connecting the image signal supplying source and the display apparatus 1 supplies.

The signal processing unit 30 includes an input capture unit 31 capturing at least one area of an input image signal; a frame buffer 33 storing an image signal output from the input capture unit 31; and an image processing unit 35 receiving an image signal from the frame buffer 33, processing so that the display unit 10 can display, and outputting to the display unit 10.

If an input image signal has a resolution higher than the maximum resolution of the display unit 10, the input capture unit 31 is controlled by the control unit 50 to capture an area selected by the user input unit 60 from the input image signal. Also, if an input image signal has the same resolution as the maximum resolution of the display unit 10, or has a resolution lower than the maximum resolution of the display unit 10, the input capture unit 31 may capture the total area of the input image signal. However, although an input image signal has the same resolution as the maximum resolution of the display unit 10, or has a resolution lower than the maximum resolution of the display unit 10, the input capture unit 31 may capture an area selected by the user input unit 60 from the input image signal.

The image processing unit 35 is controlled by the control unit 50 to adjust the frame frequency, scaling, etc., to be displayable in the display unit 10.

The output unit 40, for example, outputs an image signal input from the signal processing unit 30 without changing. However, the output unit 40 is not limited thereto, and may output an image signal not captured by the input capture unit 31 from the input image signal to an outside. For example, the image signal output to the outside by the output unit 40 may be supplied to other display apparatuses connected with the display apparatus 1 in series.

For example, the user input unit 60 includes a setting button 80 formed to an outside of the display apparatus 1 to allow a handling by a user. However, the user input unit 60 may further include a remote controller (not shown) so that a user can easily input, or may include a remote controller instead of the setting button 80. For example, three setting buttons 80 are provided, but two, four or more setting buttons 80 may be provided. Also, the setting buttons 80 are connected with the control unit 50 to display a menu in the display unit 10, and a user may select one of several options displayed in the display unit 10, or may input by increasing or decreasing numbers.

Figure 2:
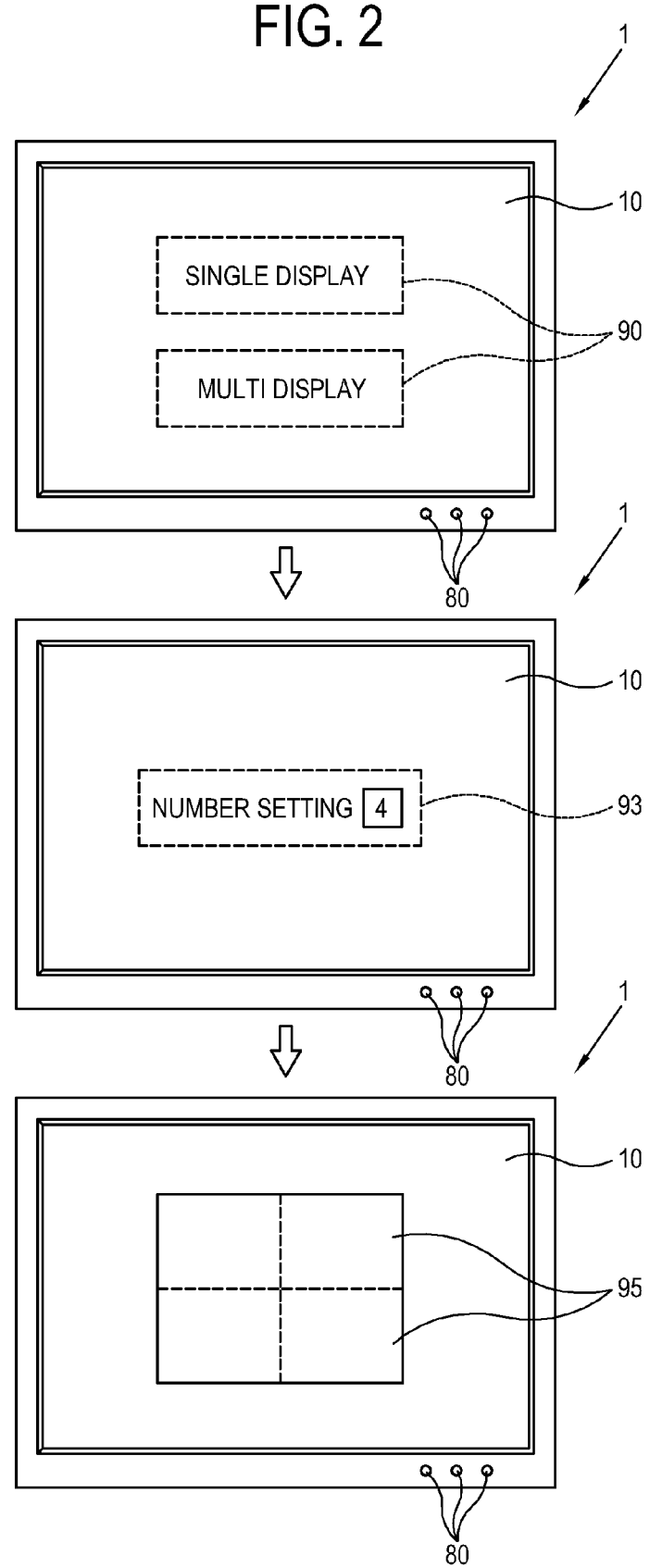
FIG. 2 illustrates a process that an on screen display (OSD) is generated in a display unit of the display apparatus according to the exemplary embodiment of the present invention.

The display apparatus 1 according to the present exemplary embodiment may further include an on screen display (OSD) generating unit 70 generating a menu in the display unit 10 for selecting an area of an image signal input to the signal processing unit 30. FIG. 2 illustrates a process in which an on screen display (OSD) is generated in the display unit 10 of the display apparatus 1 according to the exemplary embodiment of the present invention.

The OSD generating unit 70 is controlled by the user input unit 60 and the control unit 50 to generate a menu in the display unit 10 to select an area of an image signal input to the signal processing unit 30. For example, the OSD generating unit 70 may generate in the display unit 10, a mode menu 90 for selecting one of a single display mode and a multi display mode depending on an input of a user. Also, the OSD generating unit 70 may generate a number setting menu 93 for selecting the number of partition areas for partitioning an image signal of a high resolution input to the signal processing unit 30 depending on an input of a user. Also, the OSD generating unit 70 may generate in the display unit 10 a display area setting menu 95 to select an area of an image signal input to the signal processing unit 30 depending on an input of a user. The OSD generating unit 70 according to the present exemplary embodiment is exemplarily configured to generate all of the mode menu 90, the number setting menu 93 and the display area setting menu 95, but may be configured to generate only the display area setting menu 95, or may be configured to generate the display area setting menu 95 and one of the mode menu 90 and the number setting menu 93.

With this configuration, hereinafter, a process of generating an OSD in the display unit 10 of the display apparatus 1 according to the present exemplary embodiment will be described by referring to FIG. 2.

A user uses the setting button 80 formed to the outer side of the display apparatus 1 to display the mode menu 90 in the display unit 10, and selects the multi display mode of the mode menu 90. Then, the number setting menu 93 is displayed in the display unit 10, and the user uses the setting button 80 to select and input a number to the number setting menu 93. Then, the display area setting menu 95 partitions an input image signal into the set number is displayed in the display unit 10. Then, the user uses the setting button 80, and selects one partition area of the display area setting menu 95. Then, the signal processing unit 30 captures a signal corresponding to the selected partition area among the input image signal, and processes so that the display unit 10 can display.

Figure 5:
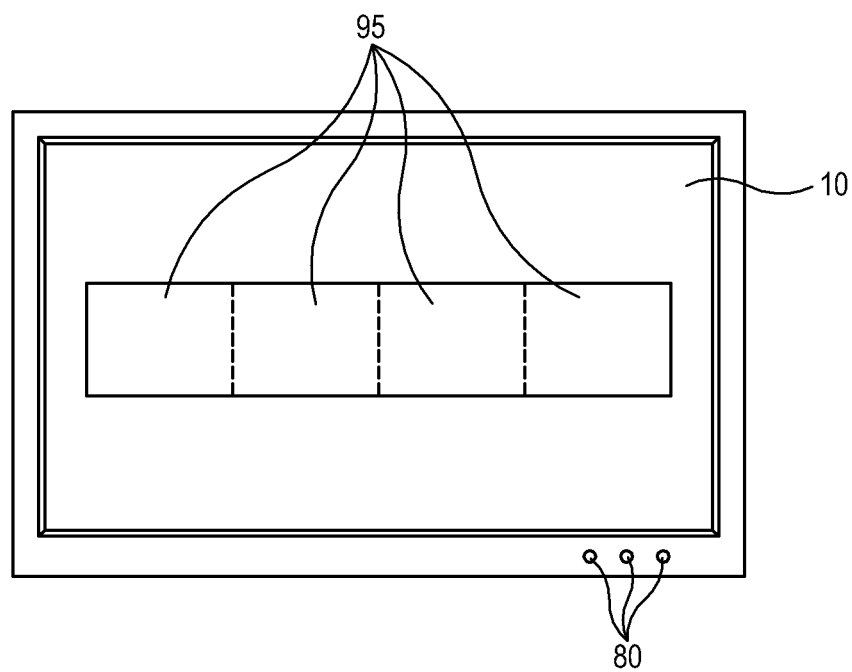

For example, if the user selects four as the number of the number setting menu 93, in the display area setting menu 95, the image signal may be partitioned into four partitions as shown in FIG. 2, or may be partitioned into four partitions in a transverse direction as shown in FIG. 5, or may be partitioned into four partitions in a perpendicular direction (not shown). That is, if the user selects four as the number of partitions in the number setting menu 93, various menus capable of partitioning the image signal into four partitions may be displayed in the display area setting menu 95, and the user may select one of the menus.

Figure 3:
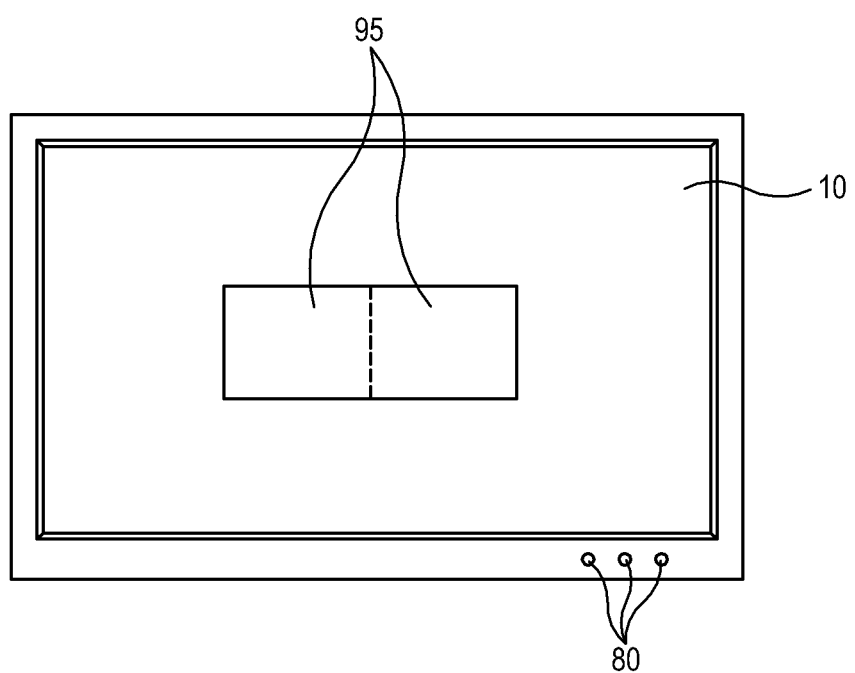
FIGS. 3 to 6 illustrate other examples of a display area setting menu in the display unit of the display apparatus according to the exemplary embodiment of the present invention.
Figure 4:
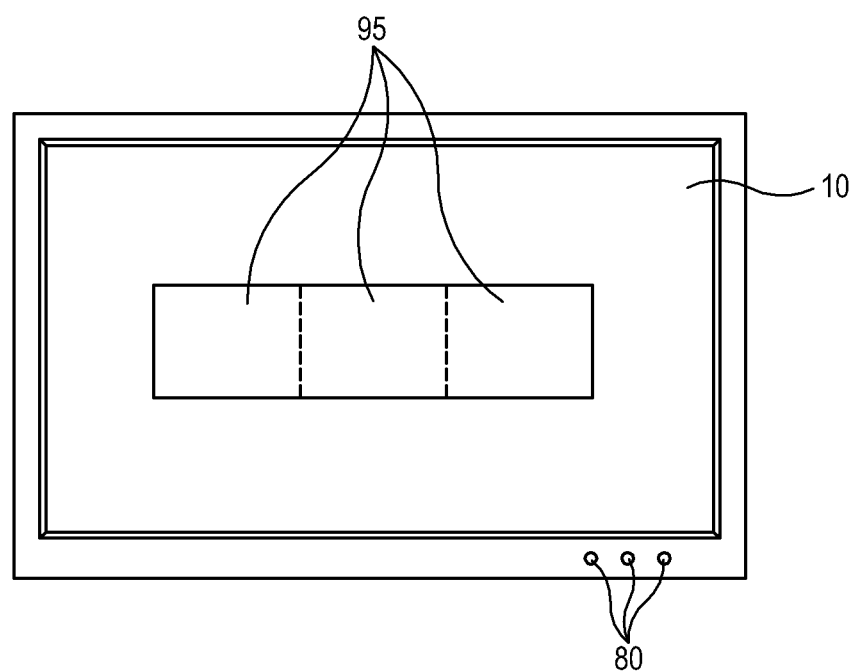
Figure 6:
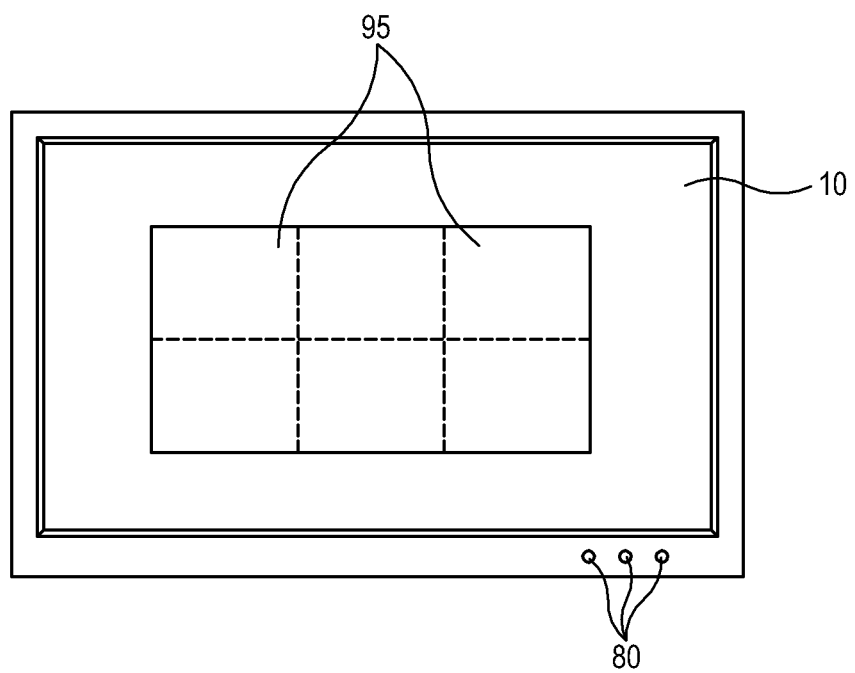

FIGS. 3 to 6 illustrate other examples of the display area setting menu 95 in the display unit 10 of the display apparatus 1 according to the exemplary embodiment of the present invention. As shown therein, as a user selects a number of partitions in the number setting menu 93, the display area setting menu 95 having various types may be displayed. That is, if the user selects two and three for the number of the number setting menu 93, the display area setting menu 95 may be displayed to partition the image signal in a transverse direction as shown in FIGS. 3 and 4. Also, if the user selects four and six for the number of the number setting menu 93, the display area setting menu 95 may be displayed as shown in FIGS. 5 and 6. However, the display area setting menu 95 is not limited thereto, and may be partitioned not in the transverse direction but in a perpendicular direction. Alternatively, two or more menus may be displayed to be selected.

Figure 7:
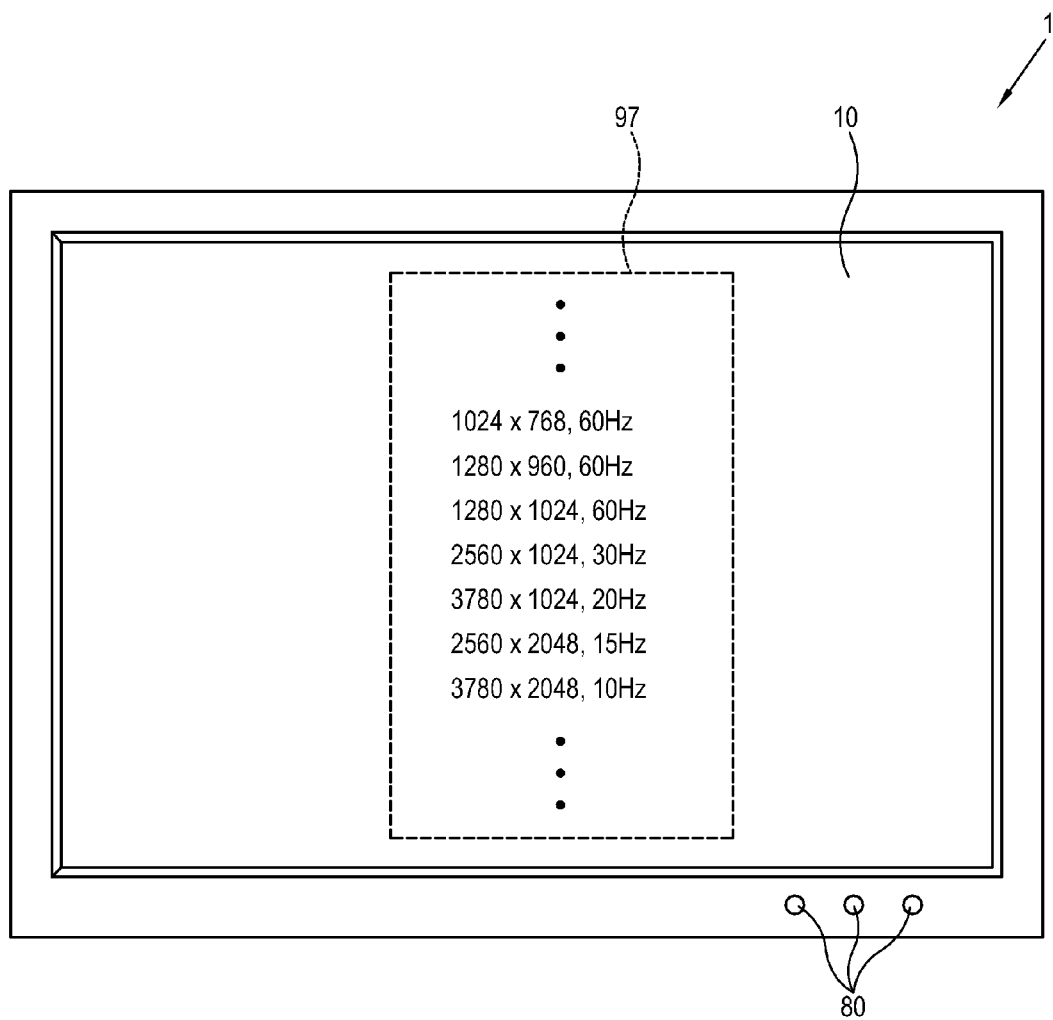
FIG. 7 illustrates an optimal resolution setting menu in the display unit of the display apparatus according to the exemplary embodiment of the present invention.

For example, the OSD generating unit 70 may be controlled by the user input unit 60 and the control unit 50 to generate an optimal resolution setting menu 97 for setting one of the resolution informations stored in the storing unit 20 as an optimal resolution. FIG. 7 illustrates the optimal resolution setting menu 97 in the display unit 10 of the display apparatus 1 according to the exemplary embodiment of the present invention.

The optimal resolution setting menu 97 may be generated by using the setting button 80 like the display area setting menu 95 described above. Also, a plurality of resolutions and frame frequency informations stored in the storing unit 20 are displayed in the optimal resolution setting menu 97. That is, for example, the maximum resolution and the frame frequency of the display unit 10 are 1280×1024 and 60 Hz, and the optimal resolution setting menu 97 includes information about a resolution higher than the maximum resolution of the display unit 10 as well as information about resolution lower than the maximum resolution. Also, in the optimal resolution setting menu 97, a frame frequency of a resolution higher than the maximum resolution of the display unit 10 is set to be lower than the frame frequency of the display unit 10. For example, in the optimal resolution setting menu 97, the frame frequency is exemplarily illustrated to be set to be lowered by an increased degree with respect to the maximum resolution (1280×1024) and the frame frequency (60 Hz) of the display unit 10. However, the present invention is not limited thereto, and the frame frequency may be lowered to be various frequencies depending on an increased resolution. That is, if the resolution is increased to 2560×2048 by four times, the frame frequency may be variously lowered to 20 Hz or 30 Hz as well as 15 Hz. Accordingly, if a user selects a resolution information higher than the maximum resolution of the display unit 10 as the optimal resolution in the optimal resolution setting menu 97, the selected resolution information is set as the optimal resolution in the storing unit 20, and the image signal supplying source will output an image signal corresponding to the optimal resolution and the frame frequency to the display apparatus 1. Also, since the user selects the frame frequency lower than the frame frequency of the display unit 10 when selecting the resolution information higher than the maximum resolution of the display unit 10 in the optimal resolution setting menu 97, the maximum bandwidth which the cable connecting the image signal supplying source and the display apparatus 1 supplies can be efficiently used.

Figure 8:
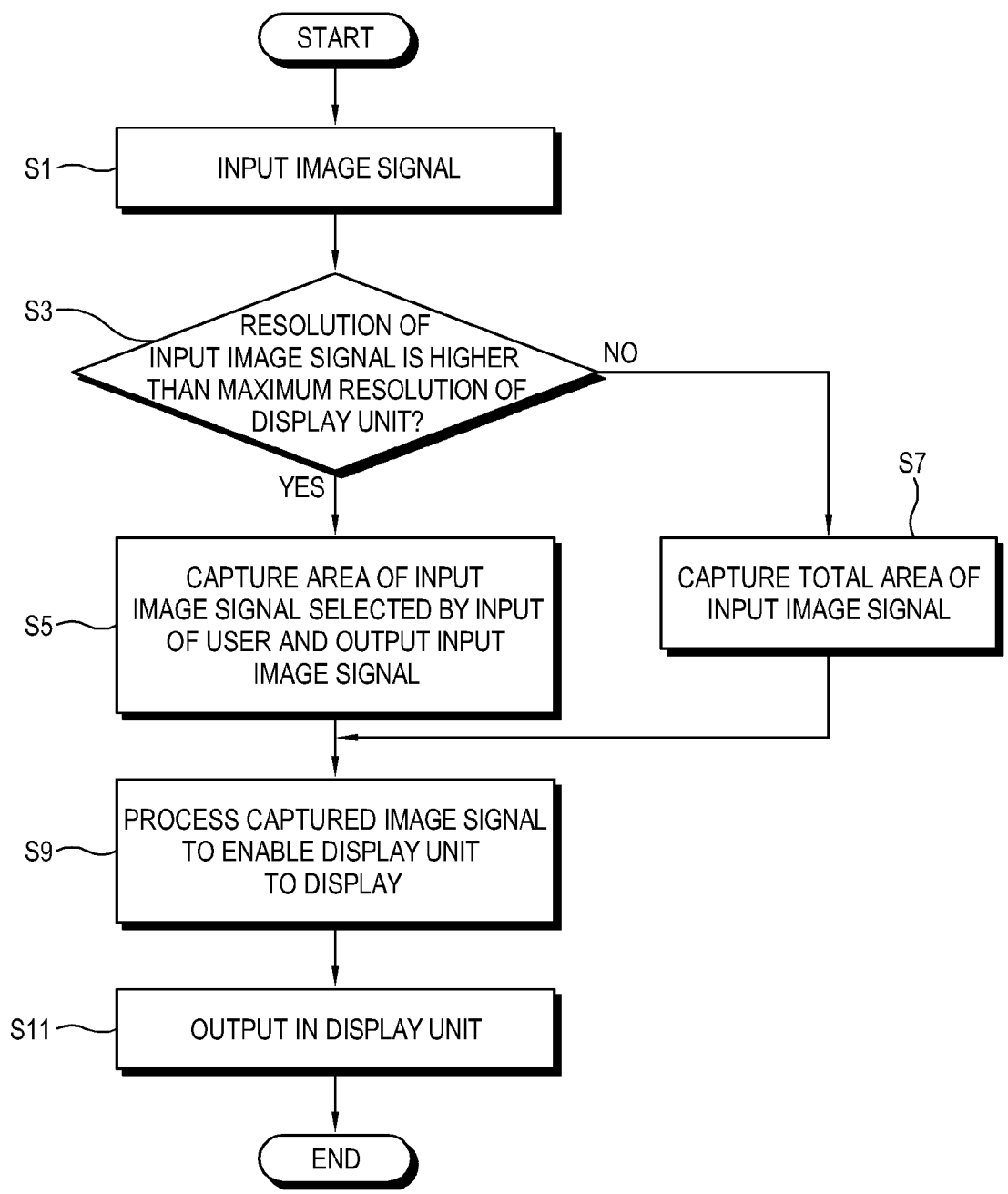
FIG. 8 is a control flowchart of a display apparatus according to an exemplary embodiment of the present invention.

With this configuration, hereinafter, a control method of the display apparatus 1 according to the present exemplary embodiment will be described. FIG. 8 is a control flowchart of the display apparatus 1 according to the exemplary embodiment, and the control method of the display apparatus 1 will be described by referring to FIG. 8.

At first, an image signal is input to the signal processing unit 30 of the display apparatus 1 from an image signal supplying source (S1). Then, the signal processing unit 30 is controlled by the control unit 50 to determine whether resolution of the input image signal is higher than the maximum resolution of the display unit 10 or not (S3). If the resolution of the input image signal is higher than the maximum resolution of the display unit 10, the signal processing unit 30 is controlled by the control unit 50 to capture an area of the input image signal selected by an input of a user, and outputs the input image signal to the output unit 40 (S5). Here, the process of selecting the area of the input image signal by the input of the user may be the same as the process of setting the mode menu 90, the number setting menu 93 and the display area setting menu 95 through the setting button 80 of the user input unit 60 and the control unit 50 as described above. However, if the resolution of the input image signal is equal to or lower than the maximum resolution of the display unit 10, the signal processing unit 30 is controlled by the control unit 50 to capture the total area of the input image signal (S7). Then, the signal processing unit 30 processes the captured image signal to enable the display unit 10 to display (S9), and outputs the processed image signal to the display unit 10 (S11). The process of setting one of the resolution informations included in the storing unit 20 as the optimal resolution by an input of a user may be the same as the process of setting the optimal resolution setting menu 97 through the setting button 80 of the user input unit 60 and the control unit 50 as described above.

Accordingly, if an image signal having a resolution higher than the maximum resolution of the display unit 10 is input, the display apparatus 1 according to the present invention appropriately partitions the input image signal and selects an area through the user input unit 60, and captures the selected area through the signal processing unit 30 to display in the display unit 10 depending on an input of a user, thereby displaying the input image signal having the high resolution without lowering the resolution to a low resolution.

Also, the display apparatus 1 according to the present invention can easily partition and select a display area of an input image signal through the user input unit 60, the control unit 50 and the OSD generating unit 70, and can set one of the resolution informations stored in the storing unit 20 as the optimal resolution, thereby easily receiving an image signal having resolution higher than the maximum resolution of the display unit 10 from an image signal supplying source.

Figure 9:
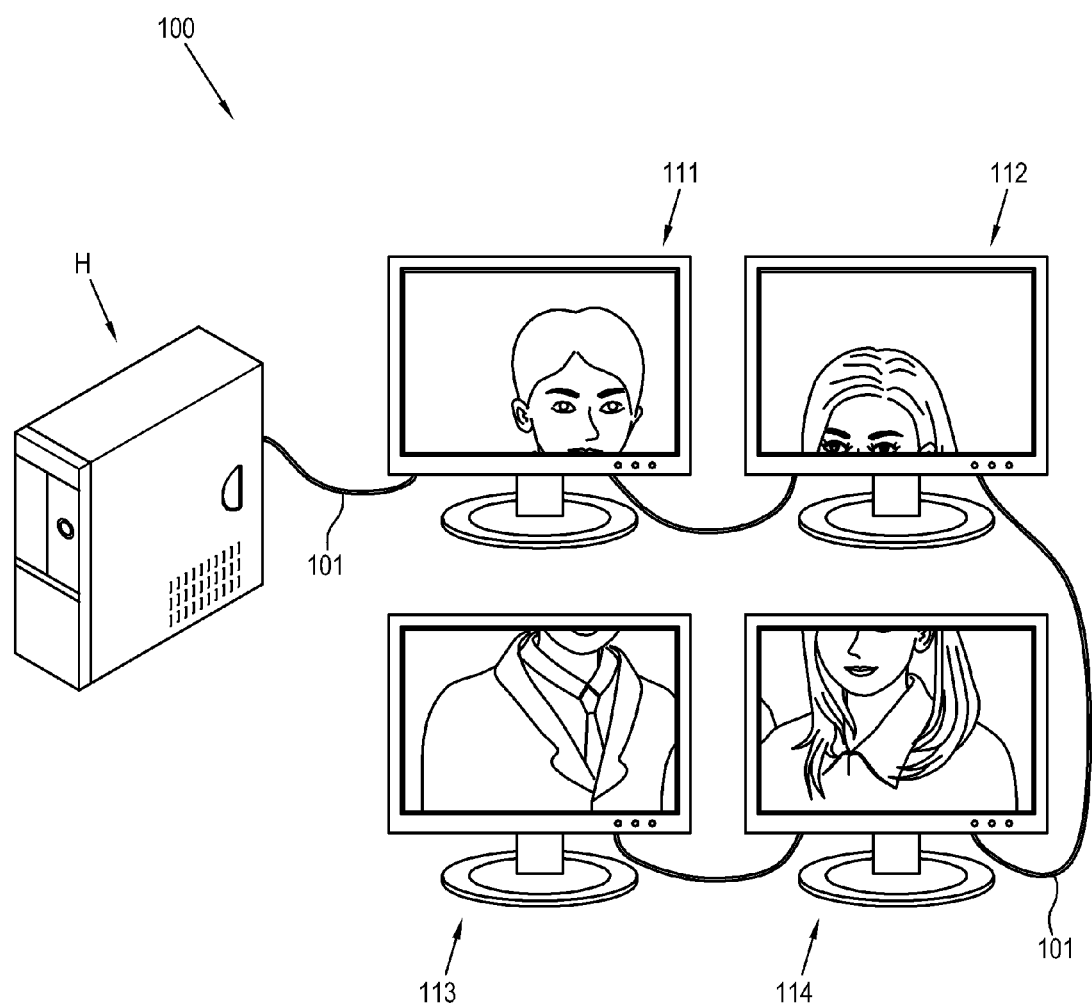
FIG. 9 illustrates a multi display system according to an exemplary embodiment of the present invention.

FIG. 9 illustrates a multi display system according to an exemplary embodiment of the present invention, and FIG. 10 is a control block diagram of the multi display system according to the exemplary embodiment of the present invention.

A multi display system 100 according to an exemplary embodiment of the present invention includes a first display apparatus 111, and a second display apparatus 112 connected with the first display apparatus 111 in series. Also, the multi display apparatus 100 according to the present exemplary embodiment may further include a third display apparatus 113 connected with the second display apparatus 112 in series, a fourth display apparatus 114 connected with the third display apparatus 113 in series, and a host computer H connected with the first display apparatus 111 in series to supply an image signal. That is, the multi display system 100 according to the present exemplary embodiment may be configured by connecting the host computer H and the display apparatus 1 described above by using more than two cables 101.

The first display apparatus 111 includes a first display unit 110 displaying an image, a first storing unit 120 in which a maximum resolution of the first display unit 110 is stored, a first signal processing unit 130 capturing an area of an input image signal of a high resolution, and processing the captured image signal to enable the first display unit 110 to display the input image signal if the input image signal has a resolution higher than the maximum resolution stored in the first storing unit 120, and a first output unit 140 outputting the image signal of the high resolution input to the first signal processing unit 130 to an outside. The first display apparatus 111 may further include a first user input unit 160, a first control unit 150 and a first OSD generating unit 170, and these configurations may be the same as the configurations of the display apparatus 1 described above.

The first signal processing unit 130 includes a first input capture unit 131, a first frame buffer 133 and a first image processing unit 135, and these configurations may be the same as the configurations of the signal processing unit 30 described above.

The second display apparatus 112 includes a second display unit 210 displaying an image, a second storing unit 220 in which a maximum resolution of the second display unit 210 is stored, and a second signal processing unit 230 capturing an area of an input image signal of a high resolution, and processing the captured image signal to enable the second display unit 210 to display the input image signal if the input image signal input from the first output unit 140 has a resolution higher than the maximum resolution stored in the second storing unit 220. The second display apparatus 112 may further include a second output unit 240 outputting the image signal of the high resolution input to the second signal processing unit 230 to an outside. The second display apparatus 112 may further include a second user input unit 260, a second control unit 250 and a second OSD generating unit 270, and these configurations may be also the same as the configurations of the display apparatus 1 described above.

The second signal processing unit 230 includes a second input capture unit 231, a second frame buffer 233 and a second image processing unit 235, and these configurations may be the same as the configurations of the signal processing unit 30 described above.

The third display apparatus 113 and the fourth display apparatus 114 may have the same configurations as the first display apparatus 111 and the second display apparatus 112 described above.

With this configuration, if an image signal having a resolution higher than a maximum resolution of a display unit is input, the multi display system according to the present invention appropriately partitions the input image signal and selects an area through the user input unit, and captures the selected area through the signal processing unit to display in each display unit depending on an input of a user, thereby displaying the input image signal having the high resolution in a plurality of display units without lowering the resolution to a low resolution.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus, comprising:
a display device configured to display an image;
a signal processor configured to receive an input image signal, and to process the received image signal to enable the display device to display an image which corresponds to at least a first portion of the received input image signal, the displayed image corresponding to the at least the first portion having a resolution which the display device is capable of displaying;
a controller configured to control the display device to display a display area setting menu for prompting a user to provide an input which relates to selecting the area which corresponds to the at least first portion of the input image signal; and
an output unit which outputs the received input image signal to an external display apparatus which includes a display,
wherein the external display apparatus is configured to process the image signal to facilitate a display of an image which corresponds to at least a second portion of the image signal, the displayed image corresponding to the at least the second portion having a resolution which the external display apparatus is capable of displaying.

2. The display apparatus according to claim 1, further comprising a storage configured to store information which relates to the resolution which the display device is capable of displaying.

3. The display apparatus according to claim 2, further comprising:
a user input unit configured to receive an input which relates to the at least the first portion of the input image signal;
and
an on screen display generator configured to generate an optimal resolution setting menu which facilitates a setting of information which relates to one of the resolutions stored in the storage as an optimal resolution based on an input received via the user input unit,
wherein the controller is further configured to control the signal processor so that the display device displays the image which corresponds to the at least the first portion of the input image signal, to control the display device to display the optimal resolution setting menu, and to control the storage to store the set information which relates to the optimal resolution.

4. The display apparatus according to claim 2, further comprising:
a user input unit configured to receive an input which relates to the at least the first portion of the input image signal, and
a controller configured to control the signal processor so that the display device displays the image which corresponds to the at least the first portion of the input image signal.

5. The display apparatus according to claim 1, wherein the output unit is configured to output the received input image signal to the external display apparatus without changing the received input image signal.

6. The display apparatus according to claim 1, further comprising an on screen display generator configured to generate a display area setting menu which facilitates selecting an area which corresponds to the at least the first portion of the input image signal.

7. The display apparatus according to claim 6, wherein the on screen display generator is further configured to generate a number setting menu which facilitates selecting a number of portions into which the input image signal is to be divided.

8. The display apparatus according to claim 1, wherein the display apparatus is connected with the external display apparatus in series and the external display apparatus is connected with a third display apparatus in series.

9. A multi display system, comprising:
a first display apparatus;
a second display apparatus which is connected to the first display apparatus;
a third display apparatus which is connected to the second display apparatus; and
a fourth display apparatus which is connected to the third display apparatus,
wherein the first display apparatus
is configured to receive an input image signal, and to process the received input image signal to enable the first display apparatus to display a first image which corresponds to at least a first portion of the input image signal, the displayed first image having a resolution which the first display apparatus is capable of displaying, and
to output the received image signal to the second display apparatus, and
wherein the second display apparatus
is configured to process the received image signal to enable the second display apparatus to display a second image which corresponds to at least a second portion of the image signal, the displayed second image having a resolution which the second display apparatus is capable of displaying,
wherein the third display apparatus is configured to process the received image signal to enable the third display apparatus to display a third image which corresponds to at least a third portion of the image signal, the displayed third image having a resolution which the third display apparatus is capable of displaying, and
wherein the fourth display apparatus is configured to process the received image signal to enable the fourth display apparatus to display a fourth image which corresponds to at least a fourth portion of the image signal, the displayed fourth image having a resolution which the fourth display apparatus is capable of displaying.

10. The multi display system according to claim 9, wherein the fourth display apparatus is further configured to output the image signal to a fifth display apparatus.

11. The multi display system according to claim 9, further comprising an image signal source configured to supply the image signal having the predetermined resolution to the first display apparatus.

12. The multi display system according to claim 9, wherein the first display apparatus is connected with the second display apparatus in series, the second display apparatus is connected with the third display apparatus in series, and the third display apparatus is connected with the fourth display apparatus in series.

13. The multi display system according to claim 9, wherein the first image, the second image, the third image, and the fourth image jointly constitute a whole image which corresponds to the input image signal.

14. The multi display system according to claim 9, wherein the first display apparatus outputs the received image signal to the second display apparatus without changing the received image signal, the second display apparatus outputs the image signal received from the first display apparatus to the third display apparatus without changing the received image signal, and the third display apparatus outputs the image signal received from the second display apparatus to the fourth display apparatus without changing the received image signal.

15. A control method of a display apparatus which comprises a display device configured to display an image, the control method of the display apparatus comprising:
receiving an input image signal;
processing the received image signal so that the display device can display an image which corresponds to at least a first portion of the received image signal, the displayed image corresponding to the at least the first portion having a resolution which the display device is capable of displaying;
determining an area which corresponds to the at least the first portion of the input image signal if the input image signal has a resolution higher than the resolution which the display device is capable of displaying; and
outputting the input image signal to an external display apparatus which includes a display,
wherein the external display apparatus is configured to process the image signal to facilitate a display of an image which corresponds to at least a second portion of the image signal, the displayed image corresponding to the at least the second portion having a resolution which the external display apparatus is capable of displaying.

16. The control method of the display apparatus according to claim 15, wherein the determining comprises displaying a display area setting menu in the display device for prompting a user to provide an input which relates to selecting the area which corresponds to the at least first portion of the input image signal.

17. The control method of the display apparatus according to claim 16, wherein the determining further comprises:
displaying, in the display device, a mode menu for prompting the user to select one of a single display mode and a multi display mode,
displaying, in the display device, a number setting menu for prompting the user to select a number of portions into which the input image signal is to be divided if the multi display mode is selected in the mode menu, and
displaying, in the display device, the display area setting menu to correspond to the selected number of portions.

18. The control method of the display apparatus according to claim 15, wherein the display apparatus further comprises a storage configured to store information which relates to the resolution which the display device is capable of displaying and information which relates to at least one resolution higher than the resolution which the display device is capable of displaying, and
wherein the control method of the display apparatus further comprises generating an optimal resolution setting menu for prompting the user to provide information which relates to one of the resolutions stored in the storage being set as an optimal resolution.

19. The control method of the display apparatus according to claim 15, wherein the display apparatus is connected with the external display apparatus in series and the external display apparatus is connected with a third display apparatus in series.

\* \* \* \* \*